United States Patent [19]
Thornton

[11] Patent Number: 5,242,339
[45] Date of Patent: Sep. 7, 1993

[54] APPARATUS AND METHOD FOR MEASURING SUBJECT WORK RATE ON AN EXERCISE DEVICE

[75] Inventor: William E. Thornton, Friendswood, Tex.

[73] Assignee: The United States of America as represented by the Administrator of the National Aeronautics and Space Adminstration, Washington, D.C.

[21] Appl. No.: 775,404

[22] Filed: Oct. 15, 1991

[51] Int. Cl.$^5$ ............... A63B 22/02; A63B 71/00
[52] U.S. Cl. .................................. 482/8; 482/54; 73/379.01
[58] Field of Search ................ 482/1, 4–5, 482/8, 9, 54, 51; 128/707, 671, 774, 779, 782, 25 R; 73/379, 865.6, 865.3, 1 R, 379.01; 185/2, 40 R

[56] References Cited

U.S. PATENT DOCUMENTS

| | | | |
|---|---|---|---|
| 3,580,083 | 5/1971 | Zipser | 73/432 R |
| 3,760,905 | 9/1973 | Dower | 185/2 |
| 3,894,437 | 7/1975 | Hagy et al. | 128/779 X |
| 3,899,915 | 8/1975 | Williams, Jr. et al. | 73/1 R |
| 4,394,865 | 7/1983 | Sidorenko et al. | 128/782 |
| 4,655,447 | 4/1987 | Dubrinsky et al. | 272/69 |
| 4,720,093 | 1/1988 | Del Mar | 272/70 |
| 4,830,021 | 5/1989 | Thornton | 128/779 X |
| 4,890,495 | 1/1990 | Slane | 482/8 X |
| 4,943,050 | 7/1990 | Smith | 482/54 X |
| 5,081,991 | 1/1992 | Chance | 482/8 X |
| 5,104,119 | 4/1992 | Lynch | 482/5 |
| 5,133,339 | 7/1992 | Whalen et al. | 128/25 R |

OTHER PUBLICATIONS

Greeisen et al., "Techniques For Determination of Impact Forces During Walking and Running in a Zero-G Environment", NASA Technical Paper 3159, 1992, pp. 1–13.

Primary Examiner—Robert Bahr
Assistant Examiner—John Leubecker
Attorney, Agent, or Firm—Edward K. Fein; Guy M. Miller; Hardie R. Barr

[57] ABSTRACT

Method and apparatus for accurately simulating locomotion in a weightless environment, specifically to prevent atrophy of a subject's musculoskeletal and cardiorespiratory systems during space travel, are disclosed. Forces, including the vertical, horizontal and lateral force generated by an individual during locomotion on a treadmill, utilizing a rigid belt with rigid transfer elements supported by low friction bogies are measured by strain gauges sensitive in their respective direction. The vertical forces produced by securing the subject to the treadmill via bungee cords in conjunction with the measured velocity of the treadmill, and the mode of locomotion are used to determine the subject's equivalent weight. The other horizontal and lateral forces are used to determine the external work produced by the subject when locomotion is performed on a nonlevel surface with an effective grade angle. The measured forces are related in such a way that the grade angle is easily determined. A motor and additional circuitry can be added to the apparatus to measure and force a subject to maintain a predetermined work rate associated with a preselected grade angle and tread velocity.

11 Claims, 11 Drawing Sheets

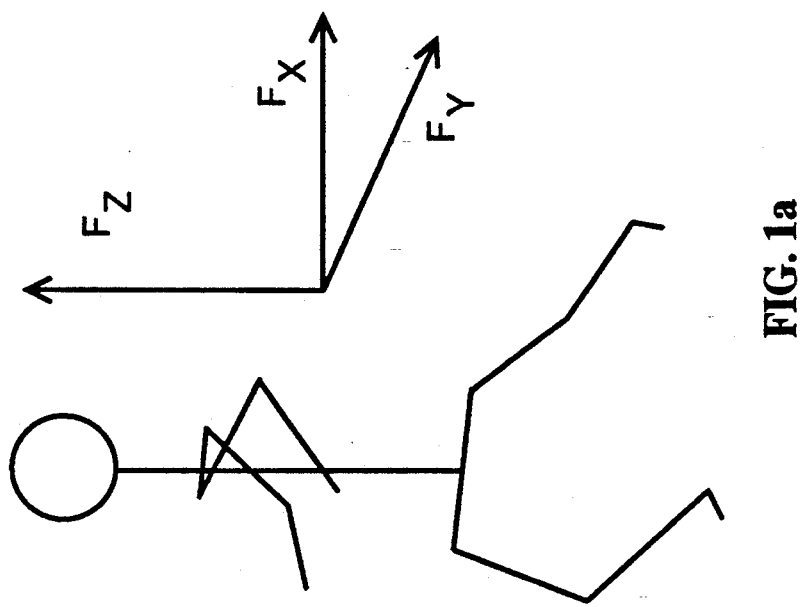
FIG. 1a
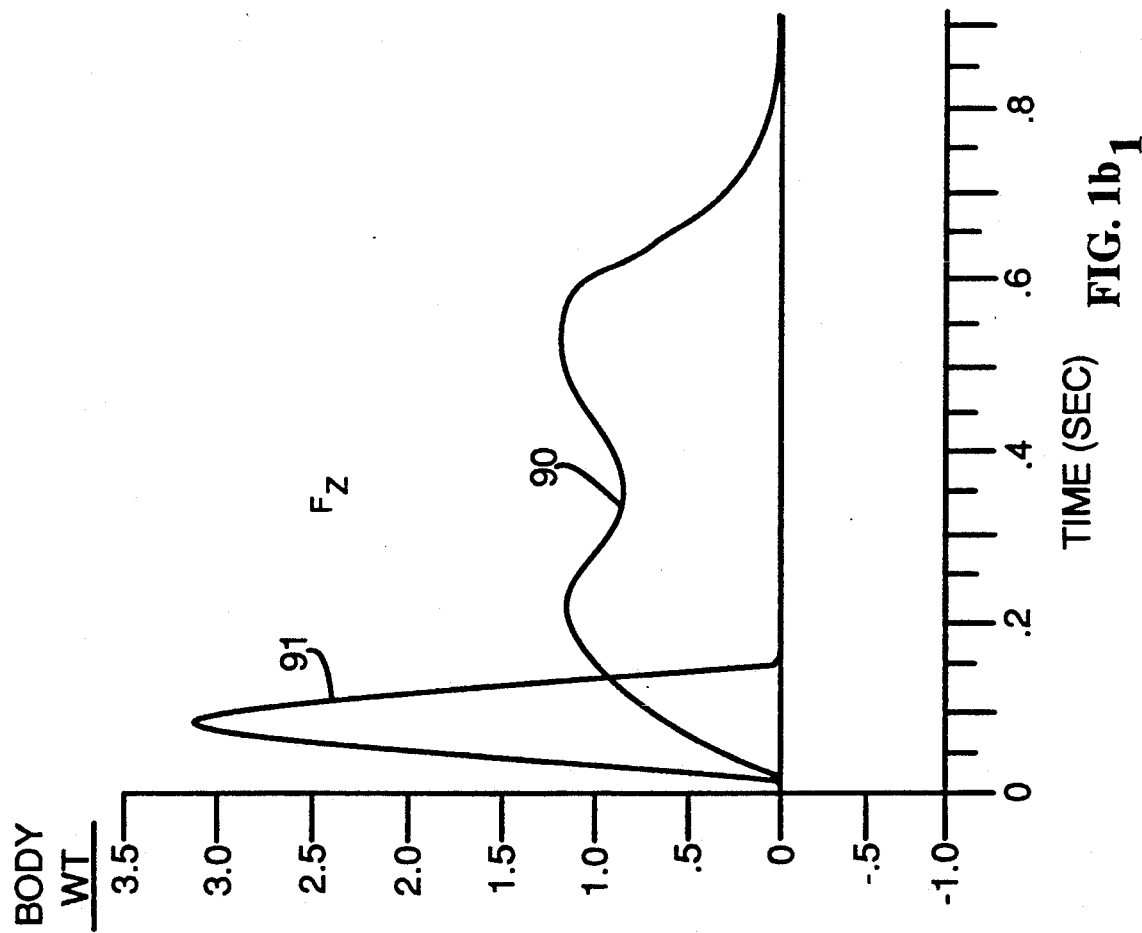
FIG. 1b$_1$

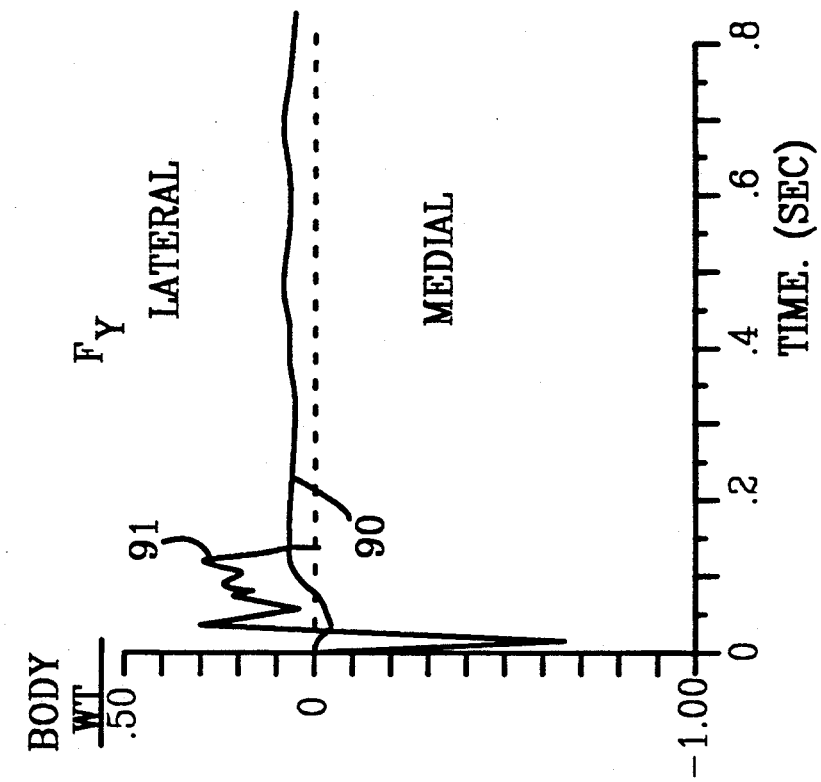
FIG. 1b₃
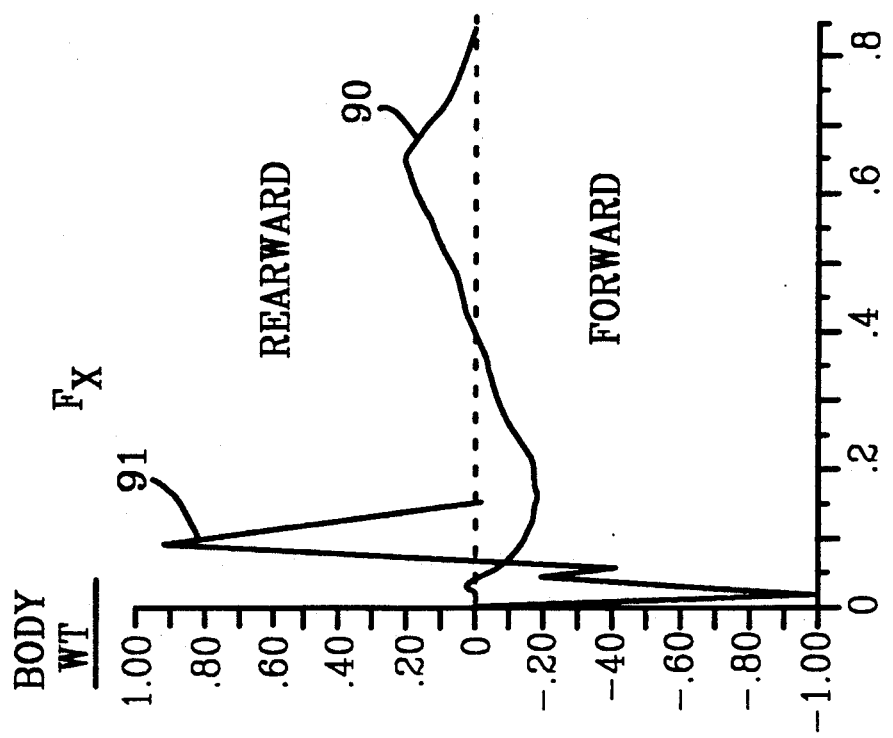
FIG. 1b₂

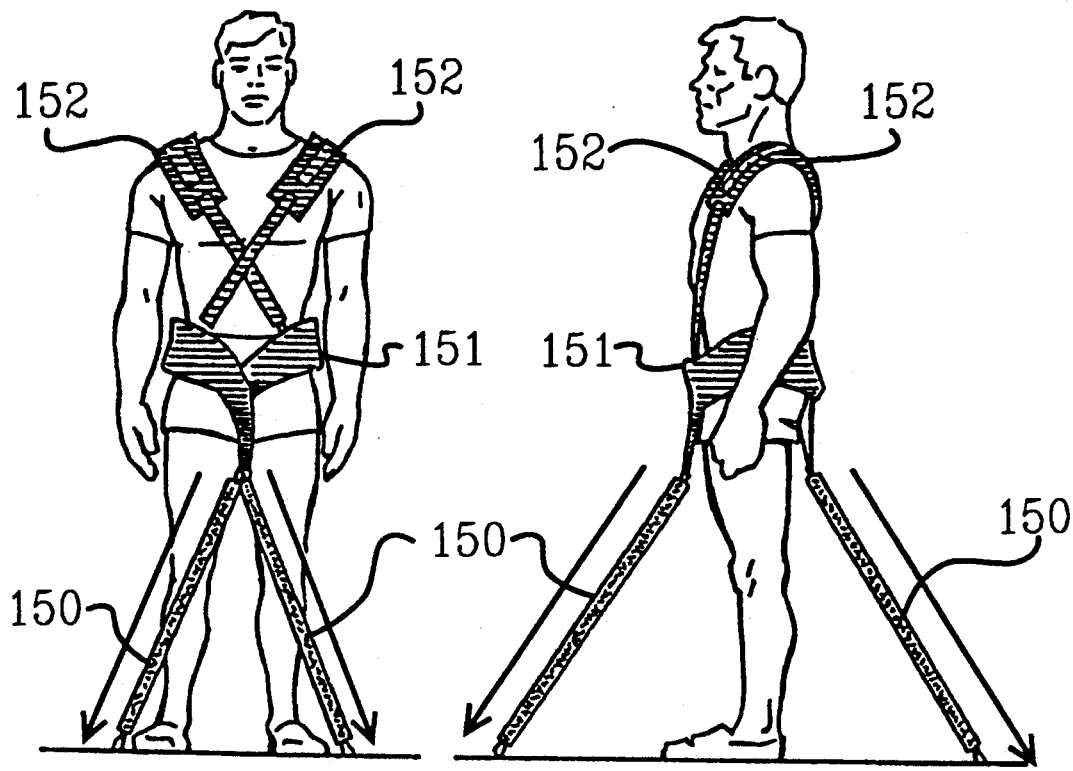
FIG. 2a  FIG. 2b
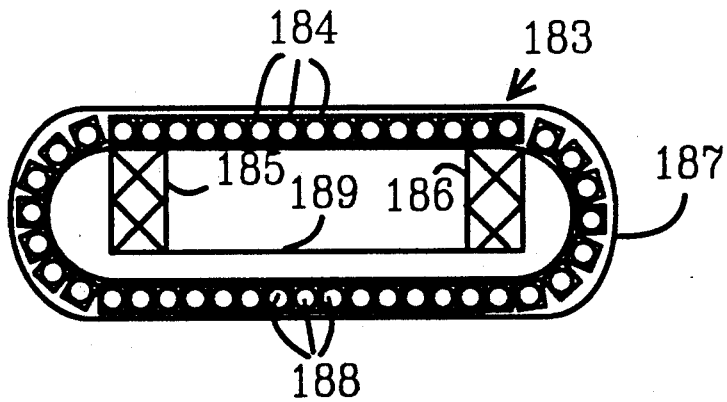
FIG. 4a
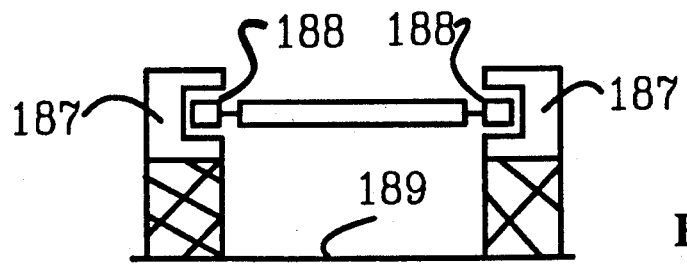
FIG. 4b

5,242,339

APPARATUS AND METHOD FOR MEASURING SUBJECT WORK RATE ON AN EXERCISE DEVICE

ORIGIN OF THE INVENTION

The invention described herein was made by an employee of the United States Government and may be manufactured and used by and for the Government of the United States of America for governmental purposes without payment of any royalties thereon or therefor.

BACKGROUND OF THE INVENTION

1. Field of the Invention

This invention pertains to an apparatus and method associated with exercise equipment, and particularly a treadmill, in a substantially weightless environment, such as exists in space flight activity.

2. Description of the Prior Art

Although an orbiting spacecraft or a spacecraft in free-fall is still obviously within the ambit of gravitational forces exerted by planets or other heavenly bodies, the gravitational exertion on the spacecraft and living beings within is balanced by centrifugal or other accelerative forces. This state is hereinafter called weightlessness. Such a state reduces many physical loads on living beings and absolutely precludes normal human locomotion.

The human body adapts to a wide range of environmental conditions. Researchers have proven that reduced locomotor activity reduces the cardiorespiratory capacity, muscle strength, mass and endurance, blood volume, and bone mineral concentration and strength. Thus, in an unstressed environment such as weightlessness, bone and muscle undergo rapid atrophy and cardio-respiratory capacity will be reduced such that after several months crewmen will no longer be able to walk on Earth.

Persons or other living beings must exercise in weightlessness as on Earth to maintain their cardiovascular, musculoskeletal, and other systems for normal activity on Earth. Human locomotion is an especially important exercise under these conditions. Primary concerns of such exercise are the foot ground forces and work level. These are absolutely dependent upon body weight, speed, grade and mode (walking or running). Since weight is a constant factor on Earth, locomotor forces and work level are not usually measured, instead they are indirectly determined by speed and grade. Body weight and grade are provided by gravitational forces which are nulled in space flight hence treadmills designed for Earth are unusable there.

Currently, the only exerciser capable of providing locomotor activity in a weightless environment of a spacecraft is a treadmill with provisions for providing an axial truncal force on an individual to simulate the body weight of the individual. Previous designs are only partially effective since actual forces and other stresses on the body are not being measured, are unknown and hence cannot be documented nor used to control the exercise. Also, means are not available to control equivalent grades.

A treadmill device that has been employed by the Union of Soviet Socialist Republics on space ventures sponsored by that country has employed elastic bungees and a harness to provide an adjustable, partly equivalent body weight or foot ground force against the tread. It is not believed that any such device includes a way of measuring that equivalent weight force. It is further believed that with such a device there is no elevation or grade provision or means for measuring or controlling grade. It is unknown but assumed that speed is measured and controlled.

Treadmill devices that have been employed by the United States on its space ventures provide mechanical means for applying forces estimated to be equivalent to body weight. These devices also have speed indicators for measuring the speed of the belt but heretofore, there has been no way to provide for and/or measure an equivalent grade. Without such information, neither forces nor work can be measured or controlled.

In addition, only passive treadmills have been used to date in the United States program and these require some minimum equivalent grade typically 10%, and this also limits their utility.

Therefore, it is a feature of this invention to provide a method of accurately simulating Earth locomotion in a weightless environment by measurement and control of essential parameters.

It is another feature of this invention to provide a small, lightweight apparatus for simulating locomotion in a weightless environment.

It is another feature of this invention to provide a method of measuring forces exerted on a body during locomotion.

It is another feature of this invention to provide an apparatus for measuring forces exerted on a body during locomotion.

It is another feature of this invention to provide a method for measuring and controlling the vertical foot ground force.

It is another feature of this invention to provide an apparatus for measuring and controlling the vertical foot ground force.

It is another feature of this invention to provide a method for producing, measuring, and controlling the equivalent grade.

It is another feature of this invention to provide an apparatus for producing, measuring and controlling the equivalent grade.

It is yet another feature of this invention to provide a means for determining locomotor mode by visual inspection.

It is yet another feature of this invention to provide improved method and apparatus for generating a requisite work rate by an individual during locomotion.

It is yet another feature of this invention to provide an improved apparatus of correlating the actual measured forces to known work rate level measurement units such as body weight and grade of the surface.

SUMMARY OF THE INVENTION

The inventive apparatus described herein for use in a weightless environment comprises in its preferred embodiments a treadmill having a transversely rigid, longitudinally flexible, continuous tread on which the user is positioned and pressed downward toward the surface of the tread. The downward force is generated by, for example, an adjustable harness or other suitable mechanical means that transmits force from cables fore and aft of the subject and including a meter or other appropriate indicator of static or mean equivalent body weight. Adjustments are made until the downward force equals the desired equivalent weight. A first plurality or series of strain elements, sensitive only in the vertical direction, for example vertical strain gauges, (normal to the plane of the tread), while being insensitive to horizontal forces, are connected at appropriately spaced positions on the treadmill. Preferably, the vertical strain gauges are mounted between the tread support members supporting the area of the tread carrying the subject and the vertical force sustaining structure of the treadmill, exerting downward pressure on respective ones of the matched pair. The electrical output of each vertical strain gauge is connected to a summation and averaging network to produce an equivalent body weight measure. The registered instantaneous measurement of vertical force is indicative of the mode of locomotion and also has research value in its own right. Average values during locomotion are used in determination of the subject work rate, grade, and equivalent body weight.

The speed of movement of the belt is measured by means of a tachometer or the like in conventional fashion. The mean weight measure in conjunction with the speed is used to determine the subject Earth equivalent work rate, which is also the total work rate when there is no equivalent grade of the belt.

When locomotion occurs on a surface with an equivalent grade of greater than zero, in addition to measuring the vertical forces, horizontal forces are also first developed and then measured. To effect an equivalent grade, forces may be applied by adjusting tension in the cables going forward from the user at a different value than those going rearward from the user, or vice versa. On the other hand, with balanced or equal forces the subject, by leaning forward, automatically generates a horizontal vector (when cables are connected for and aft of the subject) that also creates an equivalent grade. Measuring the difference in the two horizontal fore and aft vector values is accomplished by connecting a second series of a matched set of horizontal strain gauges to the forward cable(s) and to the rearward cable(s), respectively, with respect to the position of the exerciser. A horizontal strain gauge is sensitive to the horizontal force applied, but is insensitive to a vertical force. By adjusting circuitry to subtract any differences in the gauges, the net horizontal force is obtained. By treating the respective vertical and horizontal forces as orthogonal values, it is also possible to develop a value for the grade and continuous mean subject weight.

The net horizontal force times the speed is equivalent to external work rate, usually expressed in terms of grade and speed. Total work force performed by a subject consists of the internal work determined by subject weight, speed, and mode, plus the external work determined by grade, speed and subject weight.

If handles are provided so that the user can effectively apply pressure to them as well as to the treadmill belt or other surface, similar vertical and horizontal strain gauges are included connected to these handles. The handle values are added to the treadmill foot force values previously discussed to obtain the total work rate values.

By the addition of a servo-controlled motor, desired equivalent grade of any range including zero (level) and negative (downhill) may be achieved.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary preferred embodiments thereof which are illustrated in the drawings, which form a part of this specification. It is to be noted, however, that the appended drawings illustrate only typical preferred embodiments of the invention and are not to be considered limiting of its scope as the invention may admit to other equally effective embodiments.

FIG. 1a is the conventional reference system used here for vector components of a human subject's foot ground force during locomotion.

FIG. 1b shows examples of typical vector components of subject foot ground force during a walk and fast run on level ground on Earth.

FIG. 2a is a front view of an apparatus used to simulate body weight in a weightless environment.

FIG. 2b is a side view of the apparatus shown in FIG. 2a.

FIG. 4a is a representation of a physical configuration of vertical strain gauges and a segmented belt with rigid transfer elements supported by low friction bogies in accordance with a preferred embodiment of this invention.

FIG. 4b is a cross sectional view of one of the rigid transfer elements supported by low friction bogies shown in FIG. 4a.

FIG. 9b is a side view of the apparatus shown in FIG. 9a.

DESCRIPTION OF THE PREFERRED EMBODIMENTS

Figure 3A:
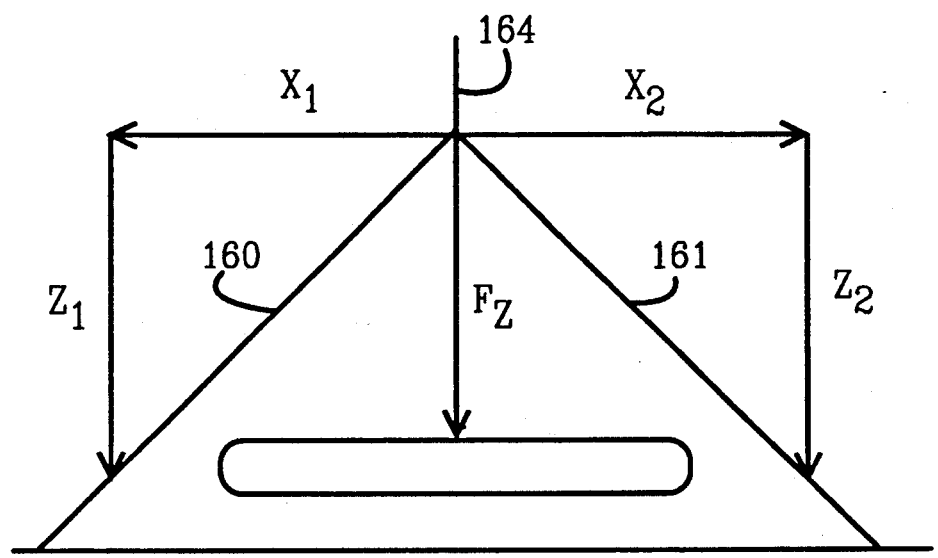
FIG. 3a is a representation of the force vectors associated with forces generated by foot to ground contact during locomotion on a level surface and the balance forces generated by balanced bungee cords attached to a subject.

Locomotion on Earth requires expenditure of metabolic energy or work and generation of large foot ground forces. The first of these determines cardiorespiratory capacity or condition while the latter determines bone and muscle status. Except for limited research foot ground force has received little attention on Earth but in space flight both work and foot ground force are crucial.

Hereinafter, "subject" refers to the treadmill user and the two terms are used interchangeably.

Subject foot ground force and work achieved during locomotion on Earth are absolutely dependent on four factors:
 subject body weight;
 subject speed;
 surface grade or incline, $i$; and
 subject locomotor mode, walk or run.

In weightlessness, body weight and surface grade quantities become Earth equivalents and will be used interchangeably. In identifying these qualities, the foot ground force generated by an individual must be determined. Now referring to the figures and first to FIG. 1a, a conventional reference system is used to identify vector force components of a subject's foot to ground force during locomotion.

FIG. 1b shows examples of typical instantaneous vertical $F_z$, horizontal $F_x$, and lateral $F_y$ vector components of subject foot ground force during a walk 90 and a fast run 91 on level ground on Earth. During walking, vertical forces between 1 and 1.35 times body weight are generated. During running, the vertical forces generated range from between 2 and 3 or more times body weight. These are forces from a single step. During walking there is an overlap of forces. While running, each foot is clear of all support for a portion of each step and all forces go to zero.

In FIG. 1a, the major locomotor foot ground force component is vertical force $F_z$, and net horizontal forces during unaccelerated locomotion at zero grade are zero over a stride (right and left step) cycle. Maximum $F_z$ vertical force varies directly with body weight and velocity during locomotion. It increases abruptly with a transition from walk to run and continues to increase but more slowly with velocity in the run mode. Treadmills with capacity for measurement of foot ground force are extremely rare.

Once foot to ground force measurements are made, work performed by an individual, hereinafter called subject work, can be determined. Subject work is defined as the sum of internal work, such as occurs on level ground, plus external work which is zero except at some grade. Internal work is complex and not measured, but empirically estimated from speed and subject weight. External work is a simple function of grade and velocity.

On Earth, treadmills are normally equipped with speed and grade indications and imposed subject work is normally expressed in only those terms. For the researcher who requires an absolute measure of external work, subject weight is a readily available property of each individual. Mode may be directly observed.

In a weightlessness condition, it is obvious that an incline, or change in grade, of the tread of a treadmill, or the particular body weight of the user, will have no effect on the forces at play or the level of work being performed. Accordingly, references to this invention with respect to grade, grade measurement, grade control, etc., refer to simulated Earth-equivalent incline. Similarly, references to this invention herein with respect to body weight forces refer to simulated Earth-equivalent body weight forces, or body weight forces as measured on Earth.

In weightlessness, weight equivalent force and grades must be generated and controlled and speed should be known and controlled. Usually, the treadmill in space will not be under the observation of the investigator or flight surgeon and mode must be obtained from data. At this point in time, researchers are also very interested in foot ground force in weightlessness, especially the net vertical force $F_z$.

Such forces are of particular interest since leg and back muscle mass and strength are determined by force level in locomotor exercise. The features necessary to measure and control these factors are implemented as follows.

FORCE MEASUREMENT AND CONTROL

Fundamental to all locomotor processes in space is application of a constant longitudinal force to the subject force normally equivalent to subject body weight on Earth. This has been accomplished to date in the United States and Union of Soviet Socialist Republics flight treadmills by elastic bungee cords and harness arrangements. The United States harness arrangement is shown in FIGS. 2a and 2b. Elastic bungees 150 are connected to a hip and shoulder harness 151 and 152 respectively. These bungees 150 are connected fore and aft as shown in FIG. 2b, laterally as done in the Union of Soviet Socialist Republics, or in any other acceptable manner and in each case the arrangement produces a single force vector 153 coincident with the subject's longitudinal axis equivalent in direction to body weight force vector on Earth.

Figure 3B:
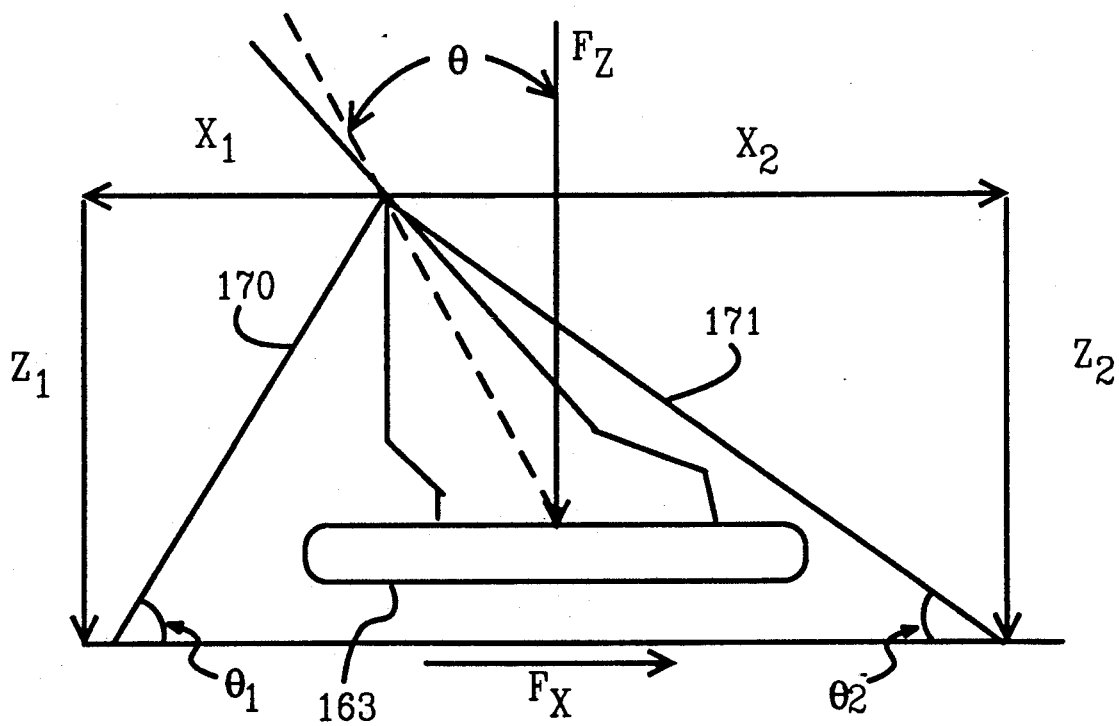
FIG. 3b is a representation of the force vectors associated with forces generated by foot ground force contact during locomotion and the unbalanced forces generated by the bungee cords attached a subject.

The vector diagram in FIG. 3a shows the resultant force and static foot ground force on a subject 164 on level ground. Tension and angle in cables 160 and 161 are adjusted such that the vectors $X_1$ and $X_2$ are equal and balanced in the horizontal direction and vector $Z_1$ and $Z_2$ are combined to produce a single vertical force, $F_z$, normal to the tread. FIG. 3b shows the vector diagram of the resultant forces generated on a treadmill with equivalent grade of greater than zero. This figure will be explained in greater detail further on in the application. Currently, only estimates of this force are available from bungees' adjustments or mechanical settings.

Referring now to FIG. 4a and 4b, an apparatus for accurately measuring a subject's static equivalent body weight is shown. A subject's force is supported by a segmented tread, generally referred to as 183, consisting of rigid transverse elements 184 connected to each other such that they can flex in the longitudinal axis. Each segment is supported to its ends by a low friction bogey or bearing 188 running in oval tracks 187. These tracks 187 are mechanically isolated except for support of strain sensitive elements 185 and 186 supported by rigid structure 189, which also carries the subject body weight force mechanism. Strain elements 185 and 186 are sensitive only in the vertical axis to eliminate errors and noise from undesired forces. Foot ground forces normal to the tread are transmitted through the bogies 188 to the support rails 187 and produce electrical signals in the force sensitive elements 185 and 186. This is only one possible embodiment.

The more common belt tread, supported by either a platen or multiple rollers, could be instrumented by placing similar strain elements between isolated platen or roller support and structure. A variety of force sensitive transducers are available and could be used. The ones selected for use here are the well known bridge connected strain gauges. Since several support points are required, the gauges must be of equal sensitivity and their outputs summed to measure total force.

Figure 5A:
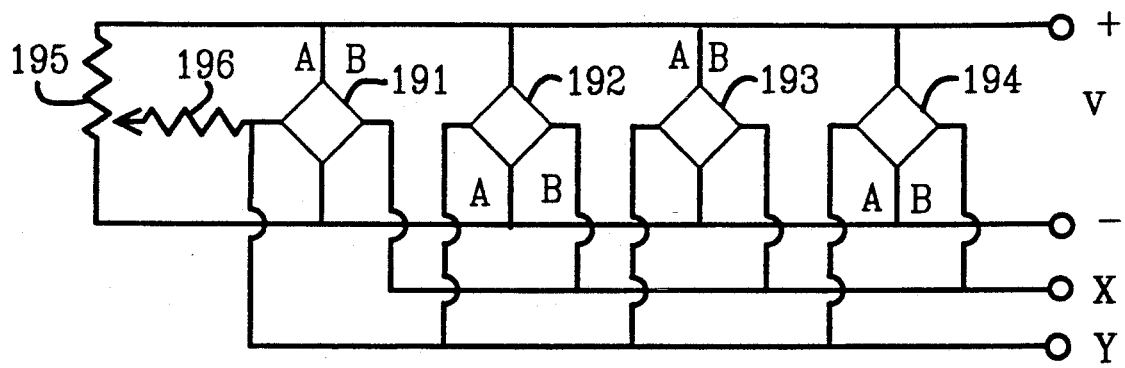
FIG. 5a is a simplified schematic diagram representation of an electrical configuration of the vertical strain gauges to generate a signal proportional to the total vertical forces measured.
Figure 5B:
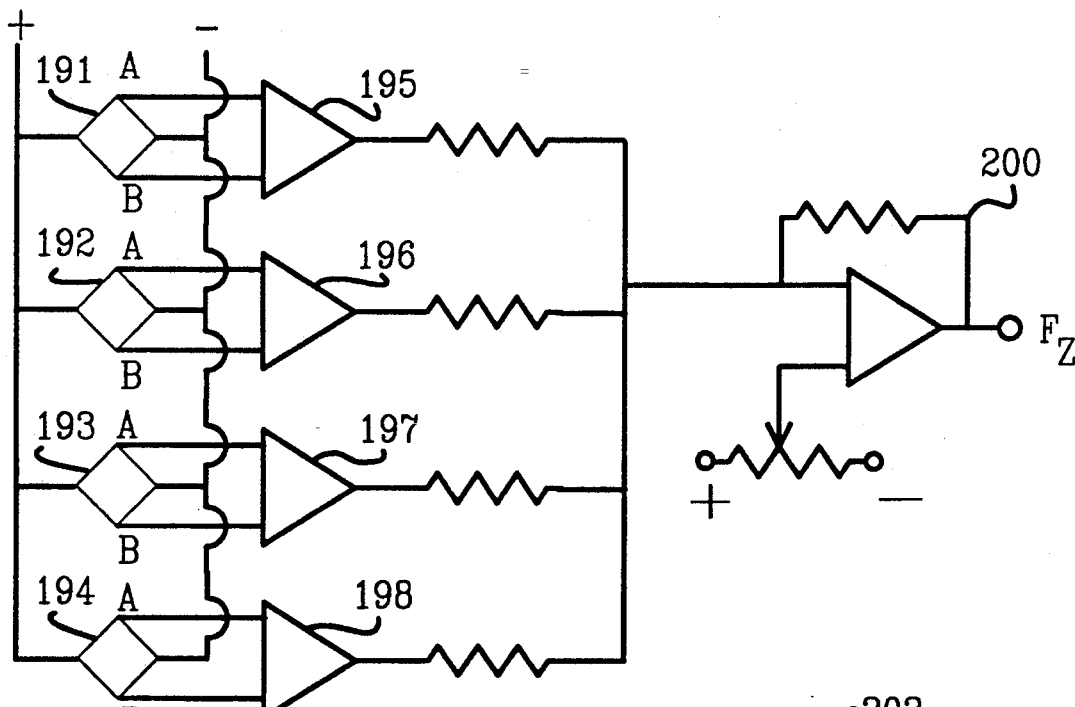
FIG. 5b is a simplified schematic diagram representation of an alternate scheme for summation of the total vertical forces measured by the vertical strain gauges.

The total vertical force $F_z$ is determined from the individual strain gauge signals, as represented by boxes 185 and 186 in FIG. 4a. Several different circuit configurations may be used to achieve this result. For example, in FIG. 5a, the strain gauges 191, 192, 193, and 194 are available in matched sets such that they can be used in parallel alignment to provide the total force. Terminals A and B are labeled to show the appropriate orientation of the strain gauges. This is the configuration used in the preferred embodiment of this invention. A variable offset current or voltage may be used to cancel weight and to eliminate any zero drift via the variable resistance network 195 and 196. An alternate scheme for summation of the total vertical force measured from the strain gauges is shown in FIG. 5b. The outputs of the strain gauges 191, 192, 193, and 194 are fed into their respective operational amplifiers, and then into a summing network including resistance networks 195, 196, 197, and 198 and gain corrector 200 to produce an instantaneous vertical force value $F_z$.

Output of this ensemble is now a measure of static equivalent body weight and may be suitably scaled and at zero grade to body weight presented on a digital volt meter in pounds or other quantity.

By suitable design of treadmill structure, the force elements can generate instantaneous vertical force $F_z$ that occur as in FIG. 1b during locomotion and these may be recorded for study.

Figure 6:
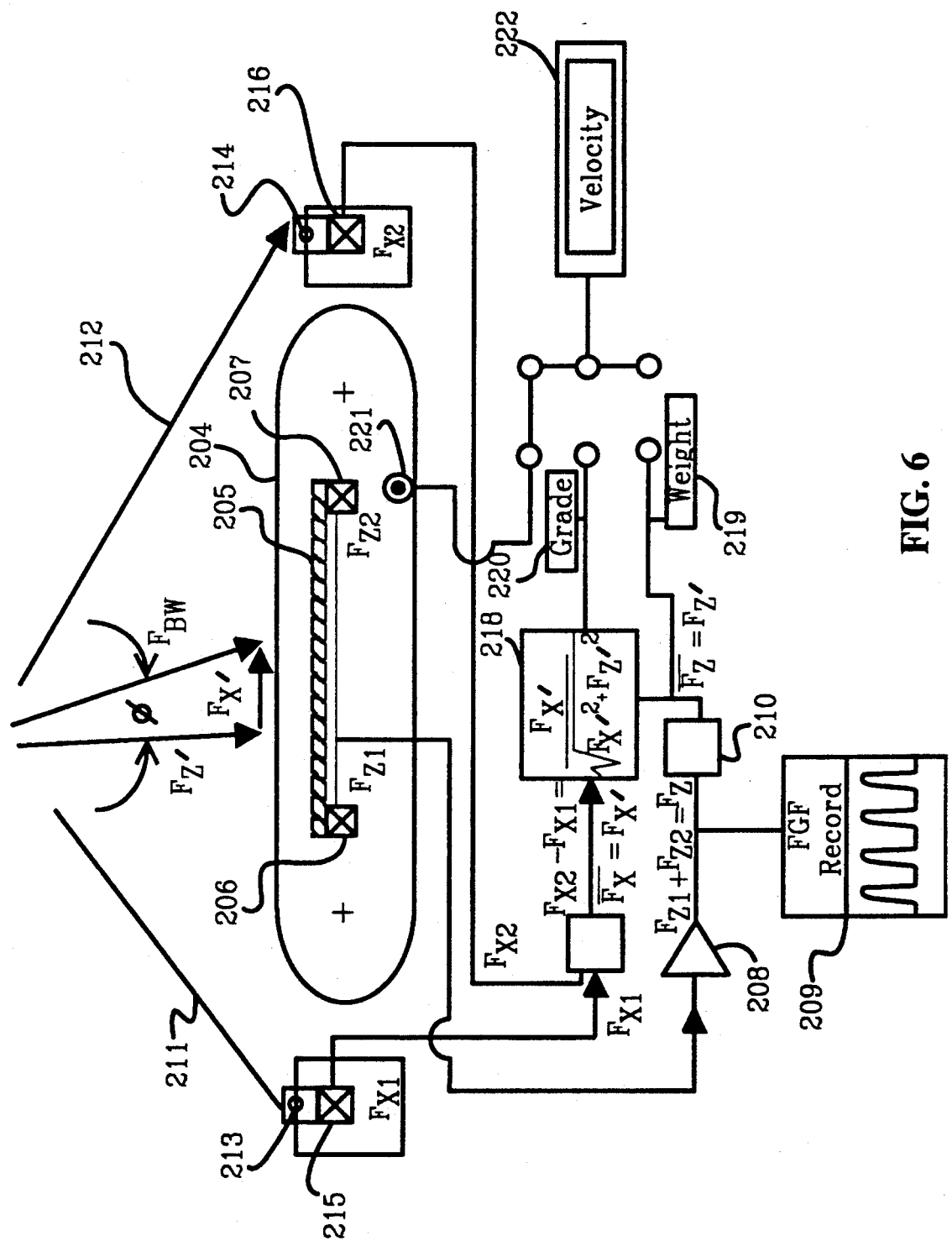
FIG. 6 is a diagram of an apparatus used to measure the forces exerted on a treadmill by a subject in accordance with a preferred embodiment of this invention.

FIG. 6 shows an example of such a design. Tread means 204 is supported by tread support means 205 to which vertical strain elements 206 and 207 are attached. Assuming element 206 measures one vertical force $F_{Z1}$ and element 207 measures another $F_{Z2}$, the total instantaneous vertical force $F_Z$ is generated by an adding network 208 and then recorded on a recorder 209.

Figure 5C:
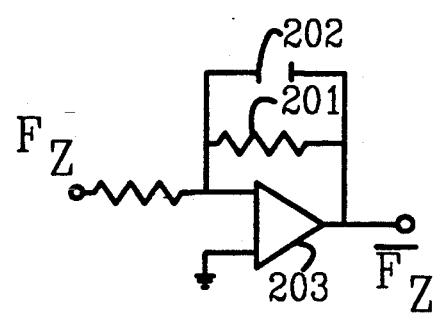
FIG. 5c is a simplified schematic diagram representation of the averaging circuitry used to average the vertical forces measured by the vertical strain gauges.

Subsequently, this total vertical force is averaged over time to produce an average dynamic vertical force on the subject by the typical averaging circuit shown in FIG. 5c. (Hereinafter mean and average will be used interchangeably.) In combination with operational amplifier 203, the values of the components resistor 201 and capacitor 202 will vary with the operational requirements chosen and can be easily determined by one skilled in the art. More complex designs may be required depending on allowable error. This average vertical force can also be used to determine the equivalent body weight measure and display it. As will be shown later, this mean force vector is required in measurement of and control of equivalent grades. Instantaneous vertical force is also an indicator of locomotor mode and this may be automatically detected by suitable circuitry or by inspection.

There are two methods for development of a mean vertical force $\overline{F_Z}$ signal for later use. Value of body weight can be assumed to remain constant, that is the subject weight equivalent force generators are constant and stable and small geometric errors during grade variation are negligible and a fixed, stored value obtained during body weight adjustment is used. A more accurate method is to measure the mean of the dynamic vertical force generated during locomotion, which must be equal to equivalent body weight, and this may be done as above with standard circuitry or with more complex frequency selective circuits.

MEASUREMENT AND CONTROL OF GRADE

Figure 7A:
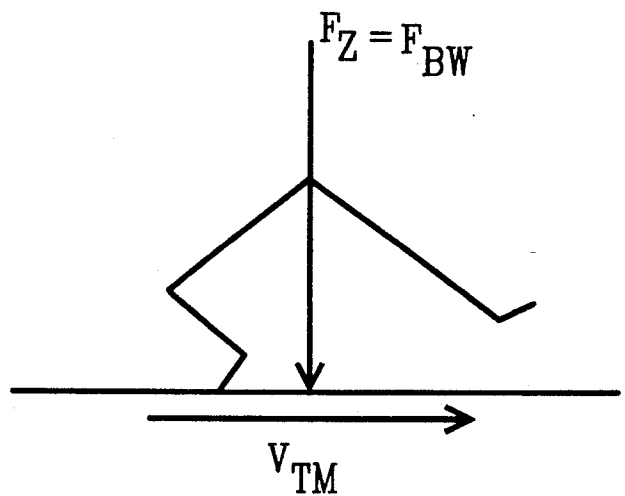
FIG. 7a is a vector representation of the forces on the body of a subject during locomotion on a level surface, at grade angle zero.
Figure 7B:
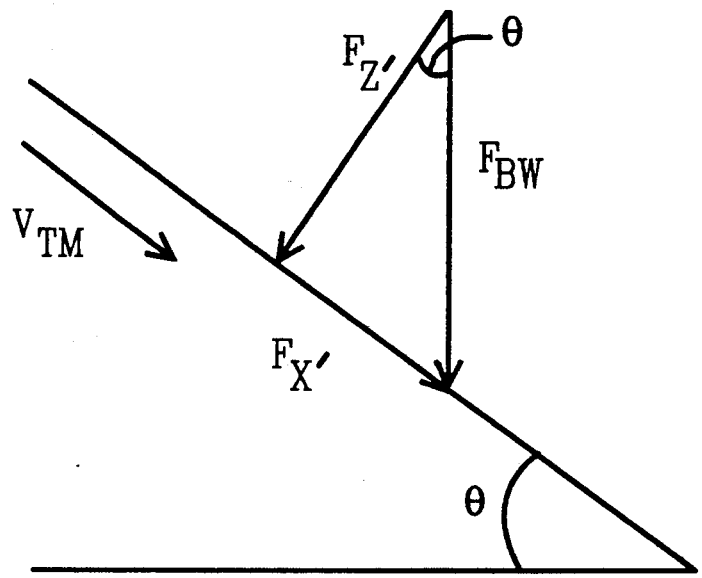
FIG. 7b is a vector representation of the forces on the body of a subject during locomotion on a level surface, surface in a gravity field.
Figure 7C:
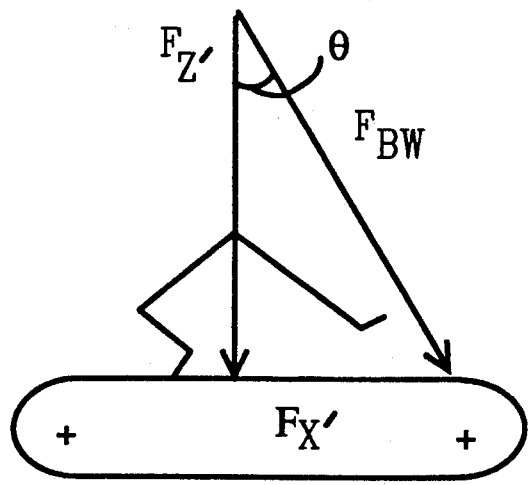
FIG. 7c is a vector representation of the forces on the body of a subject during locomotion on a surface with an equivalent grade angle $\theta$.

In weightlessness, the resultant vector force of the sum of the component vector forces becomes equivalent to that of weight on Earth. This is illustrated in FIGS. 7a, 7b, and 7c. FIG. 7a illustrates the resultant force vector on a subject that is on a level treadmill. The static foot ground force is equal to the vertical force $F_Z$ and also subject body weight, shown as $F_Z = F_{BW}$. In weightlessness, if balanced force vectors of correct magnitude are applied as in FIG. 3a, then the resultant static foot ground force is also equal to the $F_{BW}$ on Earth. If the treadmill on Earth is elevated by an angle $\theta$ as in as in FIG. 7b, then $F_{BW}$ is split into components $F_{Z'}$ and $F_{X'}$. $F_X$, $F_Y$, and $F_Z$ refer to the subject reference system and $F_{X'}$, $F_{Y'}$, and $F_{Z'}$ refer to a treadmill reference system in which positive $F_{Z'}$ is a vector coincident with and normal to the tread's long axis facing forward, positive $F_{Y'}$ is parallel to the tread's transverse, left directed axis and positive $F_{X'}$ is the axis normal to the tread and directed toward it.

In weightlessness, there is no reference weight vector. However, the angle between the resultant vector of $F_{BW}$ and $F_{Z'}$ in FIGS. 7b and 7c is equivalent to the elevation angle. On Earth, a vector component $F_{X'}$ is generated at any angle above zero. On a treadmill in weightlessness, this vector may be generated by resistance or friction, which is always present in a passive or subject driven treadmill. Hence such a treadmill must always operate at some equivalent grade. If subject weight on Earth and equivalent weight in space are equal, the passive treadmill will have to be elevated to the same angle, $\theta$, on Earth. Thus, to know and control the grade angle, it must be measured. The basis of such measurement follows.

To develop a force along the tread, horizontal force $F_{X'}$ the subject must lean forward directing the body weight vector $F_{BW}$ rearward as in FIG. 7c. FIG. 3b shows resultant unbalanced forces in that $X_2$ is larger than $X_1$ and thus produces a net horizontal force in the $X_2$ direction. Vectors can be altered by cables 170 and 171 to produce such a net effective force in either of two ways. Their tension can be relatively altered, that is, tension can be increased in the rear cable 171 or subject can equal cable tension by the automatic process of leaning forward. Alternatively cable 170 can be shortened increasing angle $\theta$ while reversing the process in the rear cable. In either case, the difference in horizontal vectors is detected by running the subject force cables 212 and 211 over frictionless pulleys 213 and 214, shown in FIG. 6. Each pulley is supported by force sensitive elements 215 and 216 in which electrical signals are developed. The desired value results from the rear signal $F_{X2}$ measured by element 216 subtracted by that of the front signal $F_{Z1}$ measured by element 215. This is done as follows.

Figure 8A:
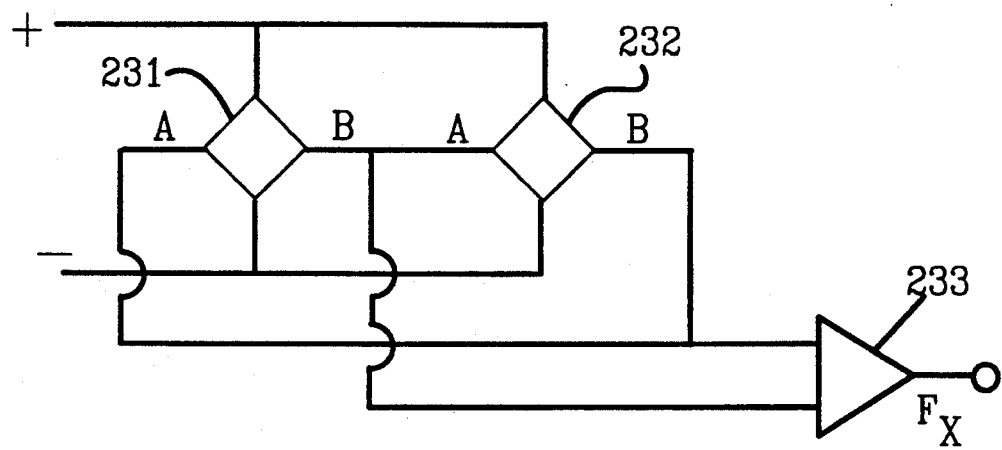
FIG. 8a is a simplified schematic diagram representation of a subtracting network used to find a net horizontal force.
Figure 8B:
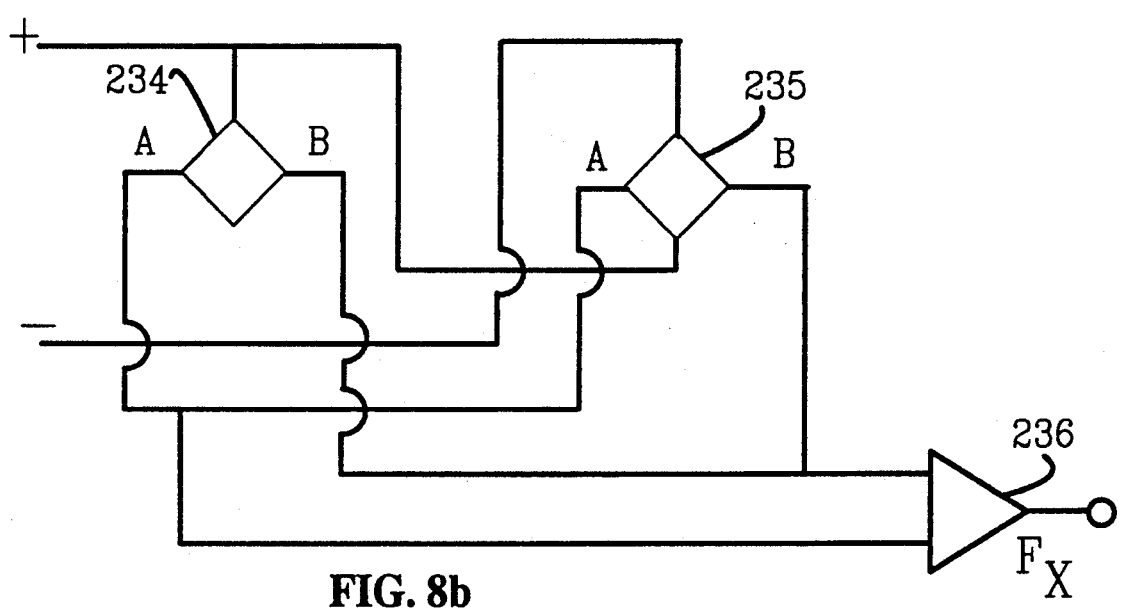
FIG. 8b is a simplified schematic diagram representation of an alternate scheme used to generate a net horizontal force.
Figure 8C:
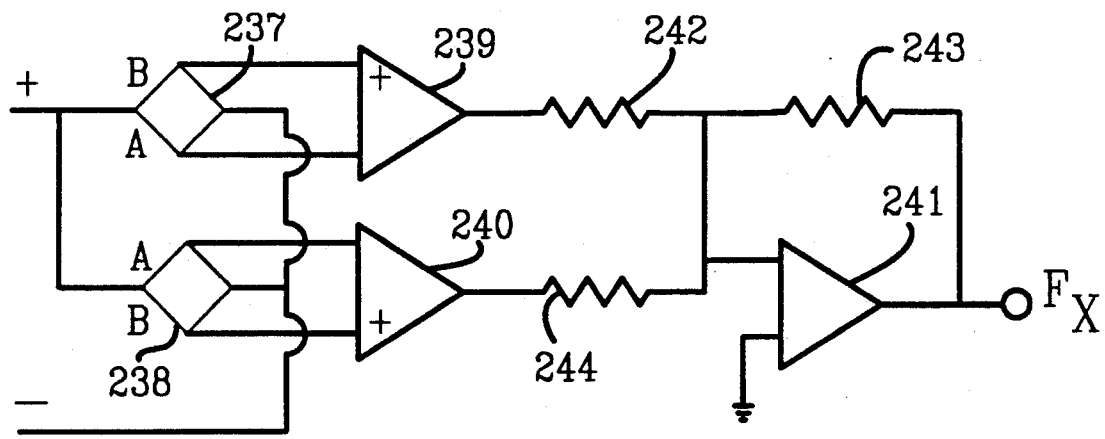
FIG. 8c is a simplified schematic diagram representation of summing amplifiers used to generate a net horizontal force.

A pair of horizontal strain gauges 215 and 216 sensitive only in the horizontal X-axis are used. Such gauges are well known and commercially available. Gauges manufactured by Omega Inc. of Stanford, Connecticut are used in the preferred embodiment of the invention. The total mean horizontal force $\overline{F}_x$ is obtained by subtracting and averaging 217 the output forces measured by the two gauges 215 and 216, which removes the static tension component. This can be done by direct connection of the gauges 231 and 232, or 234 and 235 as shown in FIGS. 8a and 8b respectively, or with summing amplifiers 239, 240, and 241 and resistors 242, 243, and 244 as shown in FIG. 8c. The values for the operational amplifiers 233 and 236 shown in FIGS. 8a and 8b as well as the resistors and operational amplifiers shown in FIG. 8c can easily be determined by one skilled in the art. The configuration in FIG. 8a is one currently used in the preferred embodiment. The output of the subtracting or summing function is fed into an averaging network such as the one shown in FIG. 5c to produce a total mean horizontal force, $\overline{F}_x$. Once this value is known and oriented to the treadmill reference $F_{X'}$, the treadmill grade may be simply calculated by known electronic techniques from the relationship $F_{X'}/F_{BW}$ where $F_{BW}$ is derived from $$F_{BW} = \sqrt{F_{X'}^2 + F_{Z'}^2}$$

as by block 218 in FIG. 6.

Thus, with a passive treadmill and the instrumentation shown in FIG. 6, body weight 219, grade 219, and mode 204 can be derived.

CORRECTION FEATURE

Figure 9A:
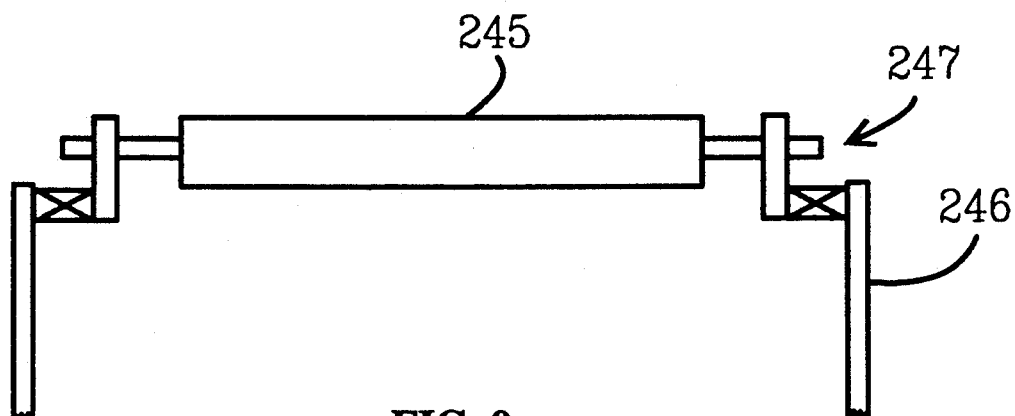
FIG. 9a is a diagram of an apparatus used to measure component forces attributed to the subjects use of a handle during locomotion on a treadmill.
Figure 9B:
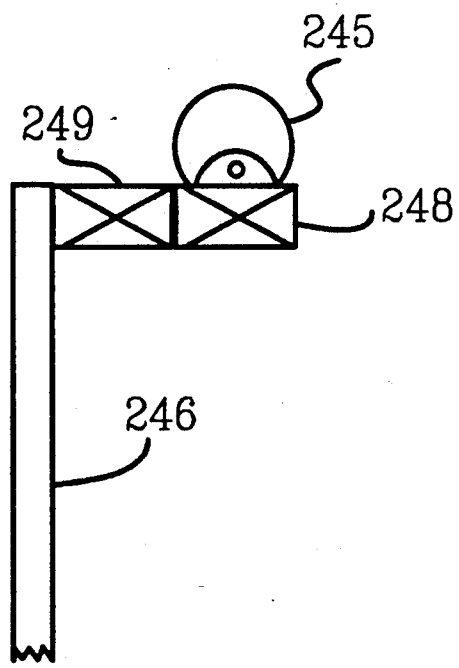

The above relationships are valid only if the subject does not introduce other forces such as those associated with holding on to a handle. In such a case, these forces must be accounted for by techniques used and shown in FIGS. 9a and 9b.

A handle 245 is supported by structural members 246 through force sensitive elements, generally referred to as 247, which respond only to horizontal 248 and vertical forces 249.

Force signals resulting from pressure on handle 245 that are components of $F_{X'}$ and $F_{Z'}$ may be processed as described earlier and appropriately added to horizontal forces $F_{Z'}$ and vertical forces $F_{Z'}$ resulting on the treads to correct any errors which might derive from extraneous support other than that from the tread itself.

TREAD VELOCITY MEASUREMENT AND CONTROL

To make treadmill work in weightlessness equivalent to that on Earth, tread velocity must be known and controlled. Measurement of velocity is currently done on United States treadmills with conventional electric tachometer and display. A wide range of such devices are available. In the preferred embodiment of this invention shown in FIG. 6, tachometer 221 measures velocity of tread 204. This value is then displayed 222.

It is also desirable to control speed and this is currently done in the United States program by a brake which rapidly increases friction above a range of any desired adjustable limit. The subject increases speed until increased force is sensed and runs just below that limit. The subject thus becomes a part of a sensitive and accurate speed control servo loop. A more extensive control is described under the motor drive for angle control.

With the above apparatus, passive treadmills can be instrumented to provide the same information commonly used on Earth as well as additional information, i.e., $F_Z$ component of foot ground force.

WORK MEASUREMENT AND CONTROL

Testing and training techniques using treadmills adapted for weightlessness can be employed using familiar procedures and quantities since Earth body weight can be accurately simulated. Once this is done, familiar standards based on velocity and grade can be used to establish conventional work loads.

Should external or treadmill loads be desired, this can be simply and directly derived by analog or digital multiplication of the mean horizontal force on the tread $\overline{F}_x$ and the velocity $V_{TM}$ of the tread to obtain the value in absolute terms as shown in the following equation:

$$\overline{F}_x \cdot V_{TM} = Work[External]$$

AUTOMATIC GRADE/SPEED CONTROL

Passive treadmills require a minimum grade to operate. This may be overcome and the grade made continuously variable by an alternate embodiment of this invention shown in FIGS. 10 and 11. An alternative speed control is also provided by this technique.

Figure 11:
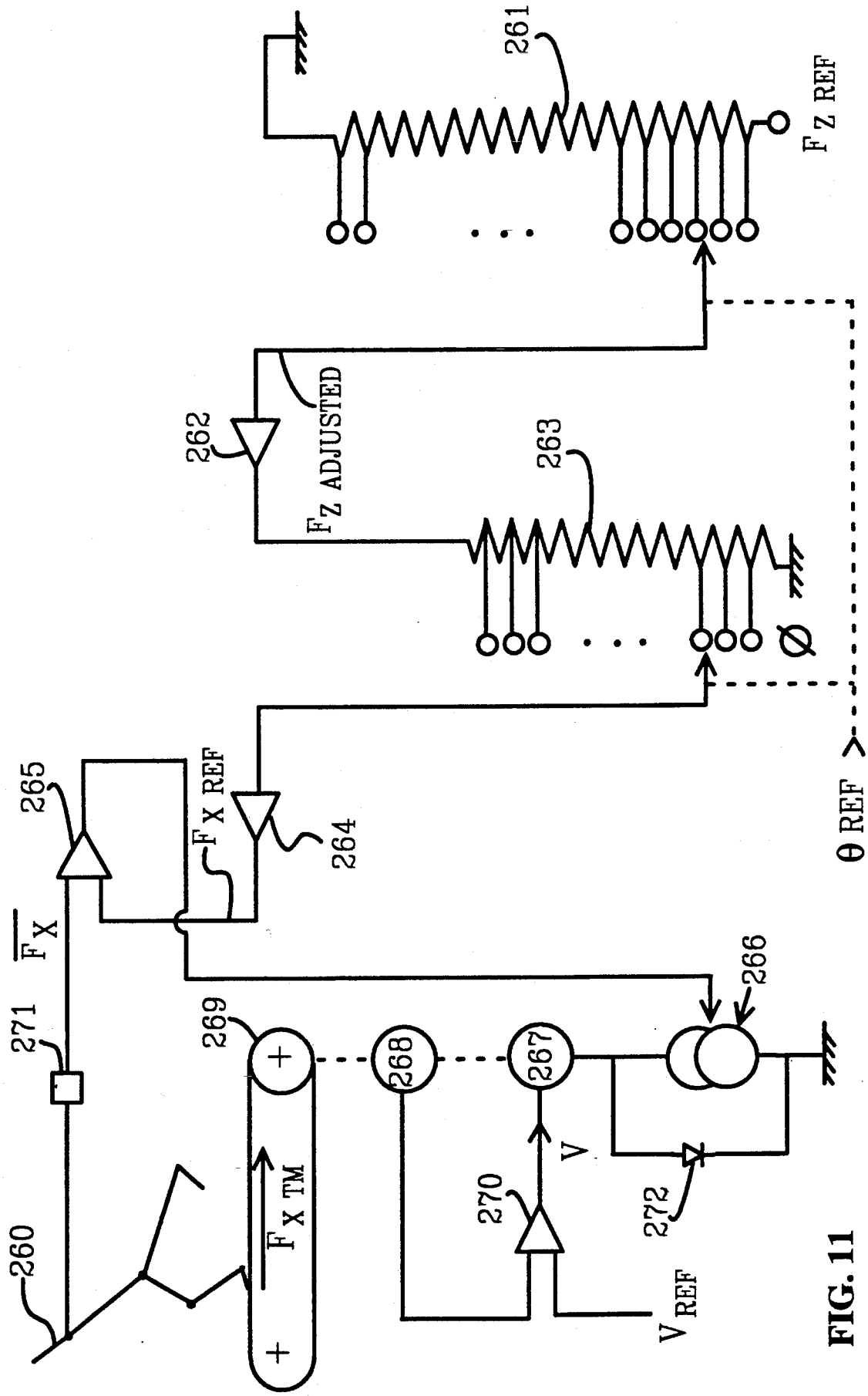
FIG. 11 is a representation of an apparatus which provides means for measuring and maintaining a predetermined equivalent grade and for work rate applied to a motor controlled treadmill by a user.

Apparatus shown in FIG. 11 provides a means for measuring and maintaining a predetermined Earth equivalent grade and consequently a work rate applied to an active motor controlled treadmill by a user thereof. The theory behind this embodiment is that the system will compare actual measured forces with calculated desired forces to determine whether the resultant speed and grade which determine work rate are achieved. If not, the system will make automatic adjustments to force the user to perform at the desired grade and velocity, hence the total work rate.

Figure 10:
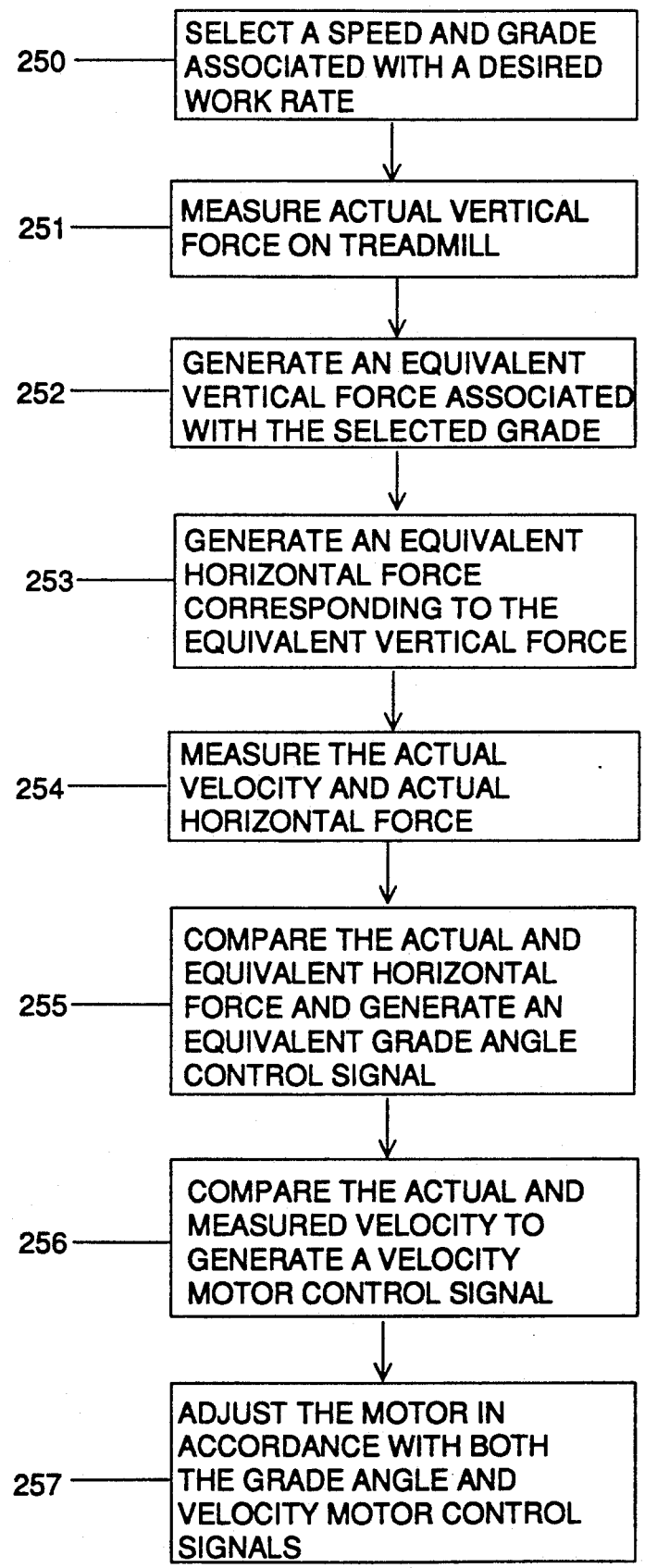
FIG. 10 is a flow diagram of a method used to generate a desired work rate on a motor controlled treadmill.

Referring to FIG. 10, a method of measuring and maintaining a predetermined work rate is shown. First, a user selects a speed and grade angle associated with the predetermined work rate, step 250. Then the actual vertical force of the user, the equivalent body weight, is measured, displayed, and adjusted as necessary as previously described in step 251. The force remains constant for a given subject performing at a given mode of locomotion and velocity.

Once the actual vertical force is measured, an equivalent vertical force associated with the selected grade angle is generated, step 252. From this equivalent vertical force, an equivalent horizontal force associated with the selected grade is generated, step 253, and compared to an actual measured horizontal force, step 254, produced by the user to generate an equivalent grade angle motor control signal, step 255. The motor is adjusted automatically in accordance with this control signal, step 257.

The actual velocity of the tread is measured, step 254, and compared to the selected velocity, step 256, to generate a velocity control signal. The motor is also adjusted automatically in accordance with the velocity control signal, step 257. The exact order of the horizontal force comparisons and velocity comparisons is not critical.

Referring now to FIG. 11, where an apparatus implementing this method is shown, this mode of operation is done by first specifying an equivalent grade angle $\theta_{ref}$ and reference velocity $V_{ref}$ associated with a desired work rate.

The total mean vertical force $F_{zref}$ on the subject 260 is then measured, by the means described earlier, and stored or alternatively, continuously measured by an apparatus shown in FIG. 6. A horizontal force component reference signal $F_{xref}$ generated by correcting the total mean vertical force $F_{zref}$ signal for the desired grade angle $\theta_{ref}$ by a variable resistance 261, which varies with $\cos \theta_{ref}$ in accordance with the equation, $F_{zadjusted} = F_{zref} \cdot \cos \theta_{ref}$. Variable resistors presently available on the market can easily be selected and used by someone skilled in the art. This procedure is consistent with the description of calculating forces from the force diagram described earlier, as shown in FIGS. 7a, 7b and 7c.

The adjusted reference voltage $F_{yadjusted}$ is sent through a buffer 262 and divided by a ganged resistor 263, which produces the referenced horizontal voltage $F_{xref}$ to satisfy the equation, $F_{xref} = F_{yadjusted} \cdot \tan \theta_{ref}$. This voltage is passed through buffer 264 and is applied to a high gain error amplifier 265, which compares referenced horizontal voltage $F_{xref}$ actual measured horizontal force $F_x$. The actual horizontal force is measured in the same manner as described in a previously described embodiment. The error or correction voltage is converted by a voltage to current device 266 to current in series with the motor 267. Motor 267 and tachometer 268 are mechanically coupled to the treadmill 269. Motor torque, which is a function of the current, will be limited to the maximum available current determined by the error signal from the high gain amplifier 265. The reference velocity signal, $V_{ref}$, is provided for comparison to the actual speed signal measured by tachometer 268 at buffer 27.

A high efficiency, permanent magnet servo motor is used in this embodiment because of its very low inertia characteristic and rapid response plus desirable response to voltage and current.

Operation of this embodiment is as follows: with desired speed $V_{ref}$ and angle $\theta_{ref}$ selected and the treadmill quiescent, the subject 260 pushes the belt of the treadmill and generates a large force $F_x$ signal to allow motor current to flow and motor torque to aid the subject bringing the treadmill to its limit speed determined by $V_{ref}$. If this speed is reached and exactly maintained, the amount of force $F_x$ required is equal to the $F_{xref}$. To maintain this condition, the subject or user must produce a force $F_x$. If such user exceeds this level, the force-current loop of strain gauge 271, amplifier 265, voltage-to-current converter 266, and motor 267 will increase the torque. Reduction of torque is accomplished by a reverse procedure. The subject must consciously attempt to increase speed to the preset limit, $V_{ref}$. When this limit is reached, the velocity control loop of motor 267, amplifier 270, and tachometer 268 reduces motor drive voltage. By adding a reverse current diode 272, unlimited current may be used to not only absorb power or in the case of significant error to produce a reverse torque.

Also note that while hands-off operations are the desired norm in weightlessness, if the subject handrail is used, force sensing as previously described will be used to detect net horizontal forces $F_x$, which are then summed with those detected by the subject weight equivalent force system.

The preferred embodiments just described are specifically designed to overcome the problems associated with the weightless environment in space. However, such apparatus is perfectly capable for use on Earth.

MANUAL GRADE/SPEED CONTROL

A simple manually operated driver motor could easily be attached to the passive system shown in FIG. 6 by one skilled in the art. A user turns the motor on and adjusts it to reach a desired grade or treadmill velocity. Once a desired level is obtained, the motor is set to maintain the grade and or speed.

While particular embodiments of the invention have been shown and described, it will be understood that the invention is not limited thereto, since many modifications may be made and will become apparent to those skilled in the art.

I claim:

1. Method of quantifying the subject work rate in a weightless environment in terms of an equivalent grade factor, the internal work rate, and external work rate, applied to a treadmill over a period of time by a user thereof, which comprises the steps of
    measuring at a plurality of locations along the treadmill total instantaneous vertical forces applied by the user when in a mode of motion,
    averaging said total instantaneous vertical forces over time to develop an average vertical force which is equal to an equivalent body weight,
    measuring along the treadmill relative to the user instantaneous horizontal forces applied by the user when in motion,
    averaging said instantaneous horizontal forces over time to produce an average horizontal force,
    measuring velocity of the treadmill,
    deriving from said equivalent body weight, said velocity of the treadmill, and said mode a measure of internal work rate,
    multiplying said average horizontal force by said velocity of the treadmill to produce a measure of the external work rate,
    deriving the equivalent grade factor of the treadmill from said average vertical force and said average horizontal force, and
    applying to the user an adjustable vertical force to produce a predetermined downwardly directed vertical force on the treadmill.

2. Method in accordance with claim 1, wherein said step of applying an adjustable vertical force comprises the step of
    attaching adjustable essentially constant force generators from the user to another surface.

3. Apparatus for quantifying the subject work rate applied to an exercise device by a user and adapted for use in a weightless environment, comprising
    a treadmill,
    means for applying to the user an adjustable vertical force to produce a predetermined downwardly directed vertical force on the treadmill,
    a plurality of vertical strain elements connected evenly spaced along the treadmill, each vertical strain elements being sensitive only to vertical force to produce a resulting electrical signal, averaging means connected to said vertical strain elements for producing an average vertical signal over time, horizontal strain element means connected to the treadmill relative to the user sensitive to measure only horizontal force and to produce a resulting electrical signal, averaging means connected to said horizontal strain elements for producing an average horizontal signal over time, a tachometer connected to the treadmill for producing a speed signal equal to the velocity of the treadmill, a means for deriving an internal work rate signal from said average vertical signal, said speed signal, and mode of locomotion, and a multiplier network connected to produce the product of said average horizontal signal, and speed signal, said multiplier network product being an external work rate signal.

4. Apparatus in accordance with claim 3, wherein means for applying an adjustable vertical force means includes bungee cords attached from the user to another location on same plane as and relative to the treadmill.

5. Apparatus in accordance with claim 3, and including a braking means for limiting maximum velocity of the treadmill.

6. Method of quantifying external work rate in a weightless environment applied to a treadmill by a user thereof, which comprises the steps of measuring along the treadmill relative to the user instantaneous horizontal forces applied by the user when in motion, averaging said instantaneous horizontal forces over time to produce an average horizontal force, measuring velocity of the treadmill, multiplying said average horizontal force by said velocity of the treadmill to produce a measure of the external work rate, and applying to the user an adjustable vertical force to produce a predetermined downwardly directed vertical force on the treadmill.

7. Apparatus for quantifying the external work rate applied to an exercise device by a user and adapted for use in a weightless environment hereof, comprising a treadmill, means for applying to the user an adjustable vertical force to produce a predetermined downwardly directed vertical force on the treadmill, horizontal strain element means connected to the treadmill relative to the user sensitive to measure only horizontal force and to produce a resulting electrical signal, an averaging means connected to said horizontal strain element for developing an average horizontal force, a tachometer connected to the treadmill for producing a speed signal equal to the velocity of the treadmill, and a multiplier network connected to produce a product of said average horizontal signal and said speed signal, said multiplier network product being a measure of the external work rate.

8. Apparatus in accordance with claim 7, and including a braking means for limiting the maximum velocity of the treadmill.

9. Method of quantifying the internal work rate in a weightless environment applied to a treadmill by a user thereof, which comprises measuring at a plurality of locations along the treadmill instantaneous vertical forces applied by the user when in a mode of motion, averaging said instantaneous vertical forces to develop an average vertical force equal to an equivalent body weight, measuring velocity of the treadmill, deriving from said equivalent body weight, said velocity of the treadmill, and said mode a measure of the internal work rate, and applying to the user an adjustable vertical force to produce a predetermined downwardly directed vertical force on the treadmill.

10. Apparatus for quantifying the internal work rate applied to an exercise device by a user and adapted for use in a weightless environment thereof while in a mode of locomotion, comprising a treadmill, means for applying to the user an adjustable vertical force to produce a predetermined downwardly directed vertical force on the treadmill, a plurality of vertical strain elements connected evenly spaced along the treadmill, each vertical strain element being sensitive only to vertical force to produce a resulting electrical signal, averaging means connected to said vertical strain elements for producing an average vertical signal, a tachometer connected to the treadmill for producing a speed signal equal to the velocity of the treadmill, and a means for deriving the internal work rate from said average vertical signal, said speed signal, and the mode of locomotion.

11. Apparatus in accordance with claim 10, and including a braking means for limiting maximum velocity of the treadmill.

* * * * *